Dec. 27, 1938.    J. ROBINSON    2,141,196
AUTOMATIC TRAIN PIPE CONNECTER
Original Filed Aug. 29, 1934    3 Sheets-Sheet 1
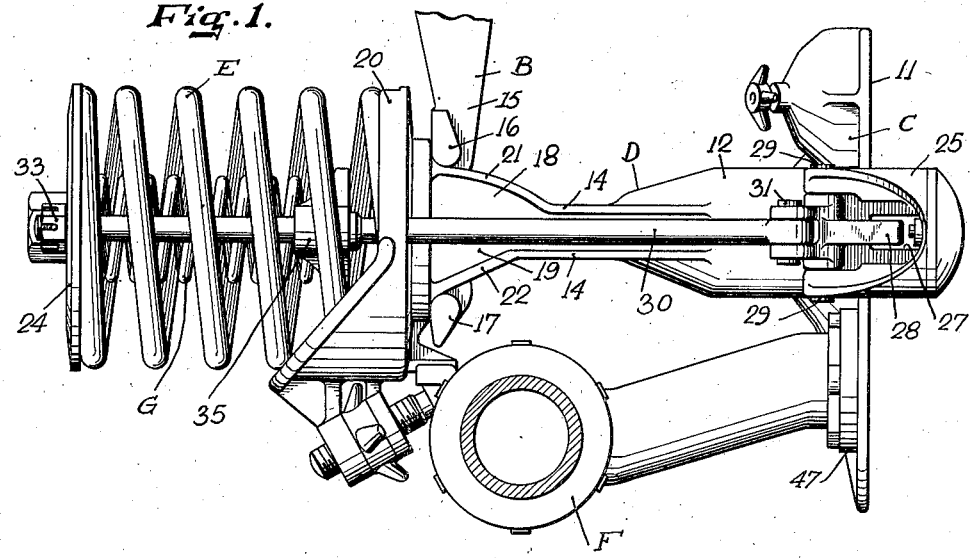
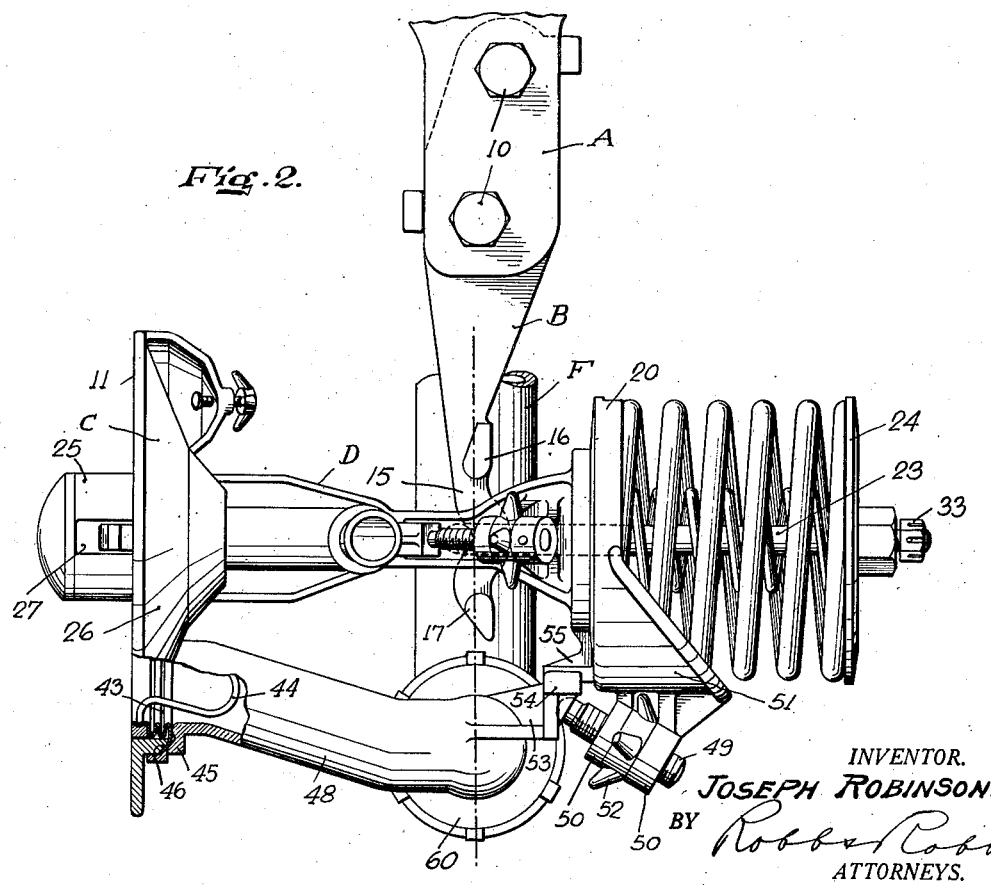
INVENTOR.
JOSEPH ROBINSON.
BY
ATTORNEYS.

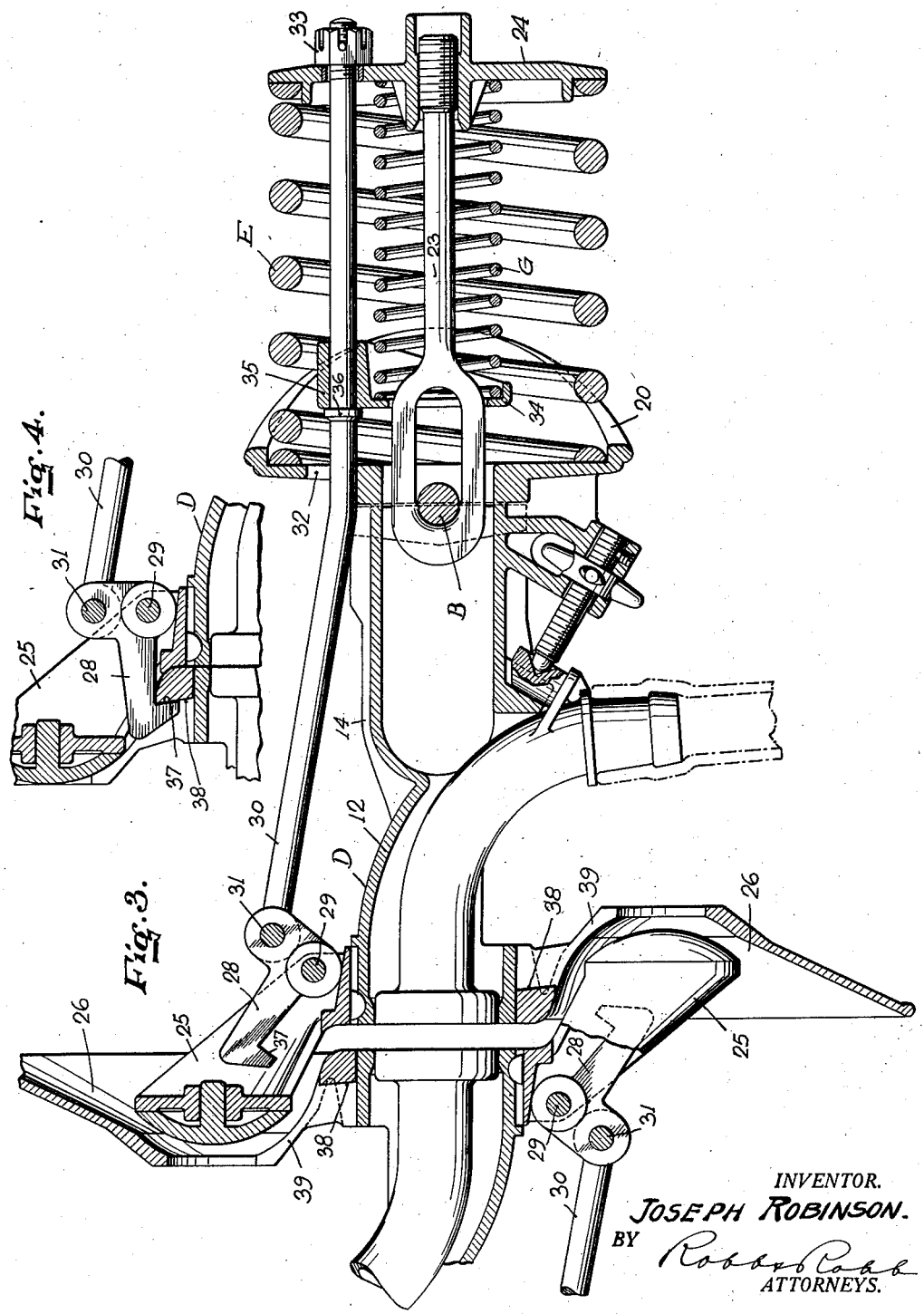

Dec. 27, 1938.    J. ROBINSON    2,141,196
AUTOMATIC TRAIN PIPE CONNECTER
Original Filed Aug. 29, 1934    3 Sheets-Sheet 3
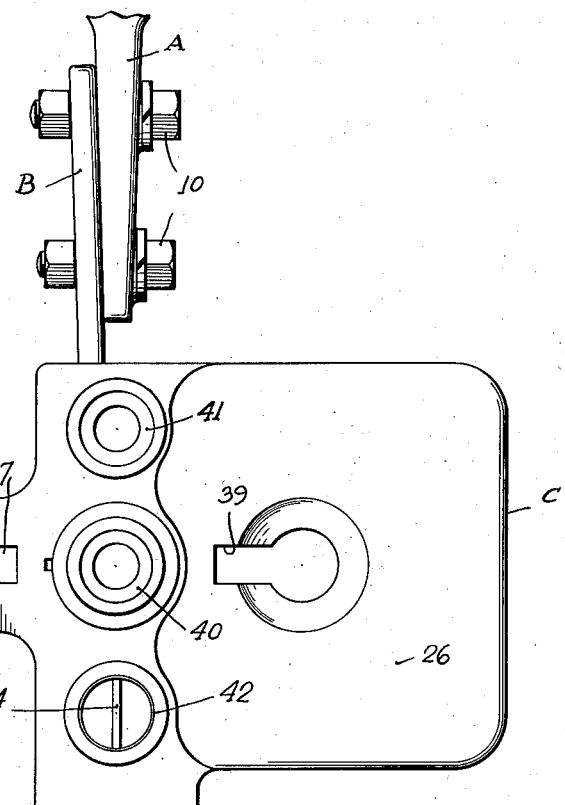
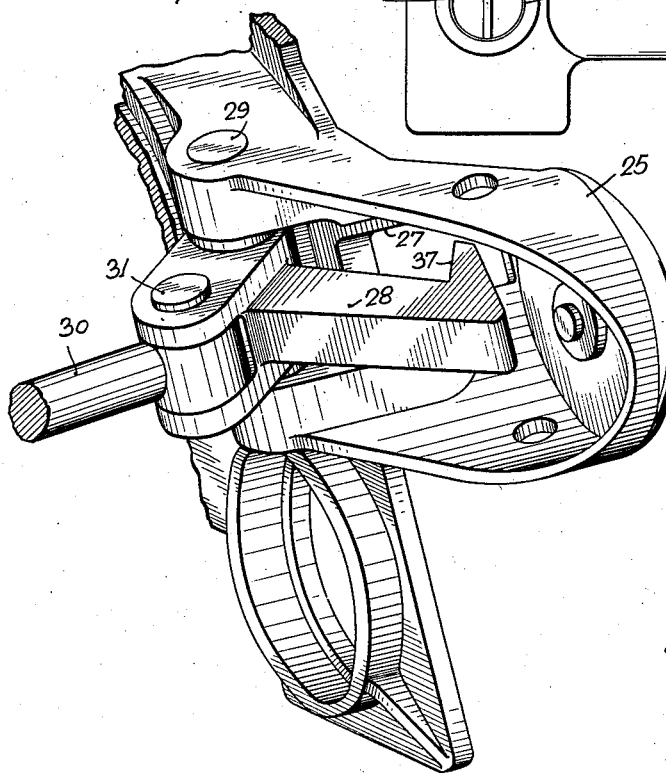
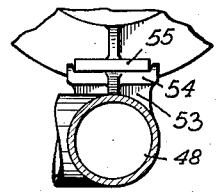
INVENTOR.
JOSEPH ROBINSON.
BY
ATTORNEYS.

Patented Dec. 27, 1938

2,141,196

UNITED STATES PATENT OFFICE 2,141,196

AUTOMATIC TRAIN PIPE CONNECTER

Joseph Robinson, New York, N. Y., assignor of one-half to Roy M. Wolvin

Application August 29, 1934, Serial No. 741,987
Renewed August 16, 1937

10 Claims. (Cl. 285—58)

The primary object of my invention is to provide an improved lock for automatically locking and unlocking coupled passenger connecter heads. The improvement includes an easing or "floating" means for minimizing the tendency of heavy steam hose to produce service stresses on the connecter heads that tend to force the locks open. It includes an automatic take up, or tightening means, whereby when the connecter locks are set the steam pressure is employed to seal its own joint. This is accomplished in a way which prevents the automatic lock from creeping open under the high pressures, and by an arrangement of parts of the lock so that they are protected against damage during the coupling operation, or when car couplers slip by.

In the accompanying drawings

Figure 1 is a side elevation of my improvement taken on the lock side of the connecter. In this view only the lower flexible joint of the metallic hose is shown;

Figure 2 is a side elevation of my improvement taken from the side opposite to that shown in Figure 1. In this view the connecter is shown in the position it occupies, with respect to the bracket, when coupled;

Figure 3 is a sectional plan view of my improved connecter showing it in the act of coupling with an opposing connecter head;

Figure 4 is a sectional detail of my improved lock in the locked position;

Figure 5 is a front elevation of a passenger connecter provided with my improvements;

Figure 6 is an enlarged detail showing my improved lock and the housing or chamber within which it operates, and Figure 7 is a detail of the guide or positioning means forming a part of my improved gasket renewing arrangement.

It will be understood that my improved connecter is suitably secured to the car coupler of the car. This is usually accomplished by providing a lug A, Figure 5, on the underside of the car coupler, and anchoring the connecter bracket B to the lug in any suitable manner, as by bolts 10. It will also be understood that the connecter face 11 projects in front of the pulling face of the car coupler a predetermined extent. For the coupling operation of the connecter the less this expansion tension the better, since the closer the car couplers approach to final engagement, before the connecters engage, the more of the aligning function they will perform, and hence the less thereof the connecter is called upon to perform. But it is necessary to project the connecter heads a sufficient distance in advance of the pulling face of the car coupler so as to give the automatic lock adequate run or throw to assure proper engagement and release under all the coupling and uncoupling positions a connecter must negotiate in service. With my present improvement this projection may be reduced to approximately 2". For connecters applied to Pullman cars, operating only over main lines, the projection may be even less.

The coupling head C of my improvement is suitably connected to the forward hollow end 12 of a pipe or yoke D having spaced straps or walls 14 which span the lower portion or anchor 15 of the bracket B. These straps ride between laterally extending lugs or members 16 and 17 formed integral or otherwise secured to the bracket. The rear end of the straps are given a comparatively wide flare, as at 18 and 19, in the vertical direction and are joined to a flange 20. These flared portions are provided with laterally extended flanges or bearings 21 and 22 which are themselves quite wide and which engage the lugs 16 and 17 at a considerable distance laterally from the center of the anchor 15. The upper flare 18 is preferably curved to a radius followed by the connecter head in its upward movement during the coupling operation. This conformation and arrangement keeps the surface 21 in engagement with the upper lugs 16 of the bracket during this movement and prevents undue rotation of the connecter head about its longitudinal axis while moving to the coupled position. This assures reliability of coupling performance, accurate alignment of the inter-engaging parts of the lock etc., without fouling or damage.

Mounted on the anchor 15, and preferably embracing it, is a rearwardly extending tie rod 23 which has rocking movement on the anchor. This feature of my present invention is generally the same as shown in some of my previous patents, among them #1,896,918. At its rear end the tie rod threadingly receives an abutment or nut 24. Between this nut and the rear face of the flange 20 I mount a suitable buffer spring E which projects the coupling head C forwardly and supports it for movement on the bracket. The spring is assembled with sufficient initial tension as to firmly support the head against undesired movement when in the normal uncoupled position, and to properly carry the weight of the lower portion of the steam hose F. The coupling head C is of the ball and funnel type in which the ball member 25 is disposed on one side of the longitudinal axis of the connecter and the funnel member 26 is located on the opposite side. The ball or horn 25 is hollow and is slotted at 27, Figure 5. Within the hollow of the ball or prong I pivotally mount my improved lock which consists of a dog or latch 28 pivoted on a vertical pin 29 extending through the walls of the ball or prong 25. A thrust or throw rod 30 extends along the outside of one of the straps 14 in approximately the plane of the horizontal center line of the connecter and is pivotally connected to the dog 28 as at 31. It projects rearwardly through an opening 32 in the flange 20, and into and through the buffer spring E, and through an opening in the abutment 24, Figures 1 and 3. On its rear end the thrust rod adjustably carries a nut 33 the position of which times the engagement and release action of the lock or latch 28. Within the buffer spring E, with its rear end bearing against the abutment 24, I provide a coiled spring G the purpose of which is to force the latch or dog 28 into locked position as the connecters couple. The force of this spring may be of any suitable amount. On the thrust rod 30 I mount a bracket or spring seat 34 through which the tie rod 23 passes and against which the forward end of the lock spring G bears and by which it is supported. The seat is provided with a sleeve or bearing 35, through which the thrust rod passes, and bears against a collar 36 on the thrust rod.

The face 37 of the latch or pawl 28 is slightly inclined rearwardly to mate with the complementarily inclined surface or seat 38 formed on the coupling head adjacent the funnel member 26 and in line with a slot 39 in the funnel for admitting the lock 28. When the connecters move to the coupled position the lock 28 drops into place on the seat 38 as shown in Figure 4, but it does not draw or wedge the faces of mating connecter heads and their gaskets together. It does however firmly lock the heads against any undesired axial movement, or rocking movement of one head on the other. The gaskets in the air brake and signal ports 40 and 41, Figure 5, being of rubber are compressed when the heads couple sufficiently to make a tight joint. But the steam gasket 42, if of a relatively hard composition to resist the high temperatures, cannot be compressed by the force of the buffer spring E sufficiently to form an unfailingly tight joint. I therefore provide an automatic clamping or take-up means for forcing mated steam gaskets against each other. The effect is the same as if the locks 28 produced a powerful clamping or binding action on the opposing heads as the locks slip in to the service position. The automatic adjustment or take-up is obtained by mounting the steam gasket 42 on an expansible or bellows type base 43 to which it is secured by a suitable retaining device 44. The rear portion of the bellows comprises an enlarged annular flange 45 which rests upon a machined surface 46 of an annular ring 47 formed integral with the head C. The gasket is set in place from the rear of the head, and is backed up by the forward end of the steam hose fitting 48 which forward end is machined. The connection between the flange 45 of the gasket and the surface 46, and between this flange and the forward end of the fitting 48, is made steam tight by means of a threaded adjustable thrust pin or plunger 49. The pin moves longitudinally through brackets 50 that are suitably attached to a projection or bench 51 on the lower side of the flange 20. The plunger 49 is suitably held against rotary movement in the bearings 50 and threadingly receives a wing nut 52 by which the plunger is adjusted in the bearings to powerfully clamp the steam gasket in place and to firmly lock the steam fitting 48 in position. To anchor the rear end of the fitting 48 against lateral movement I provide it with a lug 53, Figure 7, containing upwardly extending projections 54 which span a flat forwardly extending lug 55 on the lower portion of the flange 20. To the rear end of the conduit 48 the metallic steam hose F, or other type of hose, is suitably secured as by means of the ball and socket joint 60. This hose and joint is more fully illustrated in Figure 1 of my United States Patent 1,896,918.

Normally the lock 28 is held in the open position shown in Figures 3 and 6 and the connecter is normally positioned as shown in Figure 1. When opposing connecters having my improvements meet, the gaskets of the three vertically arranged ports in the connecter head C are brought into alignment by the ball and funnel guiding means described, the yoke D, and the flared portions 18 and 19 thereof, cooperating therewith as stated. As the car couplers move on in to the coupled position, the coupling head C is carried rearwardly to the position shown in Figure 2, compressing the springs E and G. During this movement the spring G is not compressed until the lock 28 swings to the service position shown in Figure 4. This occurs when the coupling head is shifted rearwardly a predetermined extent of approximately ¾". Thereafter the spring G is compressed through the medium of the bracket 34 and the collar 36 on the thrust rod 30, Figure 3. The initial compression of the spring G when it is assembled should be such as to exert a force of approximately 100 pounds against the bracket 34, which power thrust is materially augmented when the connecters are in coupled position. At that time this force is such as to hold the lock 28 firmly in the locked position under the maximum pressure carried at any time in the three ports of the connecter. When steam is admitted to the connecter, the expansible steam gasket 42 is driven against the face of its mating gasket, the inclination of the meeting surfaces of the lock 28 and its seat 38 on the coupling head C being in this manner secured in interlocked relation while the connecters remain coupled. In this position the connecters float on the forward end of their respective springs E, the tie rod 23 rocking on its anchor 15 to accommodate extensive movement of the connecter when necessary. The vertical width of the strap 14 being relatively limited, considerable movement of the connecters is permitted without the necessity of relative movement between the tie rod and its anchor. This arrangement minimizes the stresses produced by the sharp whipping movement of running cars, when running through frogs and crossovers, that tend to force open the locks 28. This stress on the locks is further reduced materially by connecting the steam hose F to the conduit 48 at a point directly below the pivotal connection of the tie rod 23 to the anchor 15, when the connecters are in the coupled position, Figure 2. This provision removes from the connecter head the stresses that would fall upon them, when rounding curves or when the car coupler of one car moves quickly vertically relative to the other, if the connection of the hose F was made directly back of the steam gasket 42. The uncoupling operation of the connecter is of course the reverse of the coupling movement, the lock 28 being rotated or drawn out of the locked position by engagement of the nut 33, Figures 1 and 3, with the rear face of the abutment 24.

No claim is herein made for the novel means shown in Figure 3 for anchoring the air hose conduit 56 in the forward hollow end of the yoke D, the right being reserved to claim it, and any other novel subject matter not claimed herein, in a subsequent application.

What I claim is:

1. In an automatic train pipe connecter, the combination of a supporting bracket, a coupling head in front of said bracket, a member extending from the head rearwardly past the bracket, a spring at the rear of said bracket for urging said coupling head forward, and a lock for locking the coupling head to a mating head, said lock including a pawl carried by said coupling head, a rod extending rearwardly through said spring and adapted to rotate said pawl into and out of the service position, the rear portion of said rod being disposed within said spring, and a second spring lying within said first mentioned spring for actuating said pawl.

2. An automatic train pipe connecter comprising in combination a coupling head, means for supporting the head including a spring, a forwardly extending housing on said head which also forms a guiding member, a locking pawl pivotally mounted in the said housing, and a rod for moving said pawl into and out of the service position, said rod extending rearwardly through said spring and having on its rear portion an abutment for cooperating with said rod to actuate said pawl.

3. An automatic train pipe connecter comprising in combination a bracket, a coupling head in front of said bracket, a yoke spanning said bracket and connected with said coupling head, a tie rod pivotally mounted on the lower portion of the bracket and extending rearwardly, a spring surrounding said tie rod and acting against said yoke to urge said coupling head forward, a forwardly extending housing on said head which also forms a guiding member for the head, a locking pawl pivotally mounted in said housing and adapted to be rotated behind an opposing coupling head, a rod pivotally connected to said pawl and extending rearwardly through said spring, and means to cause said rod to move said pawl into and out of the locked position under the influence of longitudinal movement of said coupling head.

4. An automatic train pipe connecter comprising in combination a bracket, a coupling head in front of said bracket, a member connecting the head and the bracket, a spring behind the bracket acting against said member, a rod extending from the rear of said spring forwardly therethrough and along one side of said member, a locking pawl mounted on a vertical pivot on said head and adapted to be rocked in the horizontal plane into and out of locked engagement with a mating coupling head, a seat for a spring on said rod, and a coiled spring acting against said seat to shift said pawl to the locked position and hold it there.

5. An automatic train pipe connecter comprising in combination, a bracket, a coupling head in front of said bracket, a yoke connecting the head and the bracket and spanning the latter, a tie rod embracing the lower end of the bracket and extending rearwardly thereof, a coiled buffer spring surrounding said tie rod and bearing against said tie rod, a throw rod extending through the said spring forwardly along one side of said yoke, a seat for a spring carried by said throw rod and lying within said buffer spring, a spring mounted on said seat, a locking pawl pivotally mounted on said head and connected to said throw rod at the forward end of the latter, an abutment on said tie rod, and a stop for engaging said abutment for co-acting with said throw rod to lift said pawl out of the service position.

6. In an automatic train pipe connecter, the combination of a supporting bracket, a coupling head in front of said bracket, a member extending from the head rearwardly past the bracket, a buffer spring at the rear of said bracket for urging said coupling head forward, and a lock for locking the coupling head to a mating head, said lock including a pawl carried by said coupling head, a rod extending rearwardly past said spring and adapted to rotate said pawl into and out of the service position, and means for preventing fouling or jamming of said lock during the coupling operation, said means including spaced straps on said member which span said bracket and which are provided at their rear portions with flaring guides normally lying between vertically spaced laterally projecting members arranged on opposite sides of the lower end of said bracket, the upper surfaces of said guides being curved to a radius followed by the connecter head in its upward movement during coupling operation so as to retain continuous contact with the upper laterally projecting members as said coupling head moves upwardly in the act of coupling.

7. An automatic train pipe connecter comprising a supporting bracket, a coupling head in front of said bracket, a yoke connecting the head and bracket, a tie rod engaging the bracket and extending rearwardly therefrom, a main buffer spring, an abutment carried by said tie rod and forming a bearing for one end of the spring, a thrust rod disposed longitudinally of the axis of the connecter and passing through the said buffer spring abutment, a member carried by the rear end of the thrust rod and engaging the rear face of said abutment, a locking pawl carried by the head, and connected with the thrust rod at its front end to be moved into and out of service positions thereby, a projecting member on the thrust rod, an abutment member movable upon the thrust rod between said projecting member and the buffer spring abutment member, and yielding means interposed between the buffer spring abutment member and the abutment member on the thrust rod.

8. An automatic train pipe connecter substantially as claimed in claim 7, wherein the abutment member movable on the thrust rod is provided with an opening through which the tie rod passes, and the said resilient means between the buffer spring abutment and the abutment on the thrust rod is disposed coaxial with the tie rod.

9. An automatic train pipe connecter substantially as claimed in claim 7, wherein the abutment member movable on the thrust rod is provided with an opening through which the tie rod passes, and the said resilient means between the buffer spring abutment and the abutment on the thrust rod comprises a coil spring disposed within the buffer spring and coaxial therewith, said coil spring encircling the tie rod and being coaxial therewith.

10. A train pipe connecter comprising a bracket structure, a coupling head movably mounted forwardly of said bracket structure, a supporting member extending from the head to a point rearwardly of the bracket structure, spring means cooperating with the bracket at its rear side and connected with said supporting member, a forwardly extending housing on said coupling head forming a guiding member, a mechanical locking device movably mounted in the housing of said coupling head, instrumentalities for moving said locking device into a locking service position in coaction with a mating coupling head cooperating with the coupling head, and automatic actuating means for increasing the locking effect between said locking device and the coupling head working in coaction with the first mentioned coupling head.

JOSEPH ROBINSON.